Patented Sept. 8, 1936

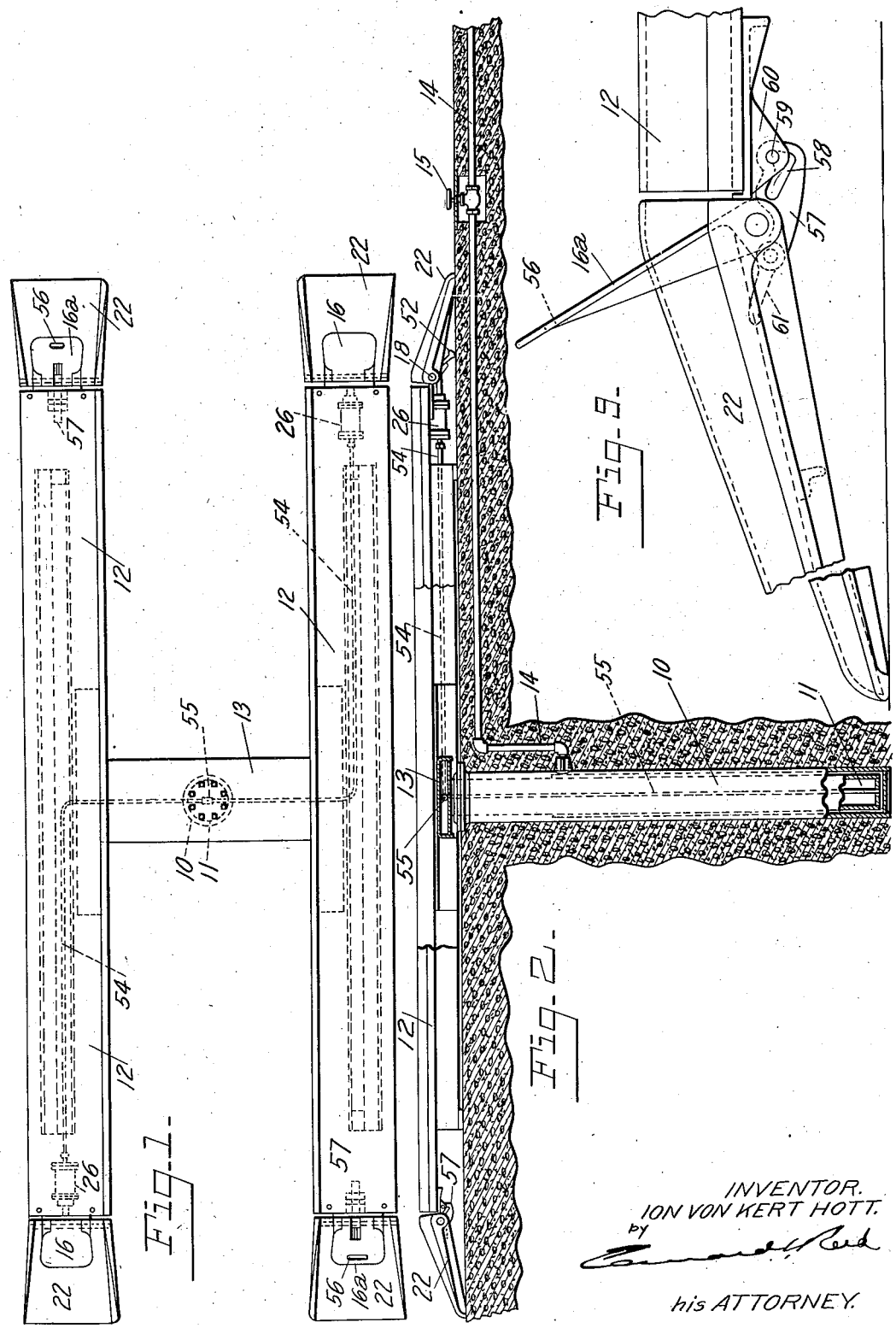

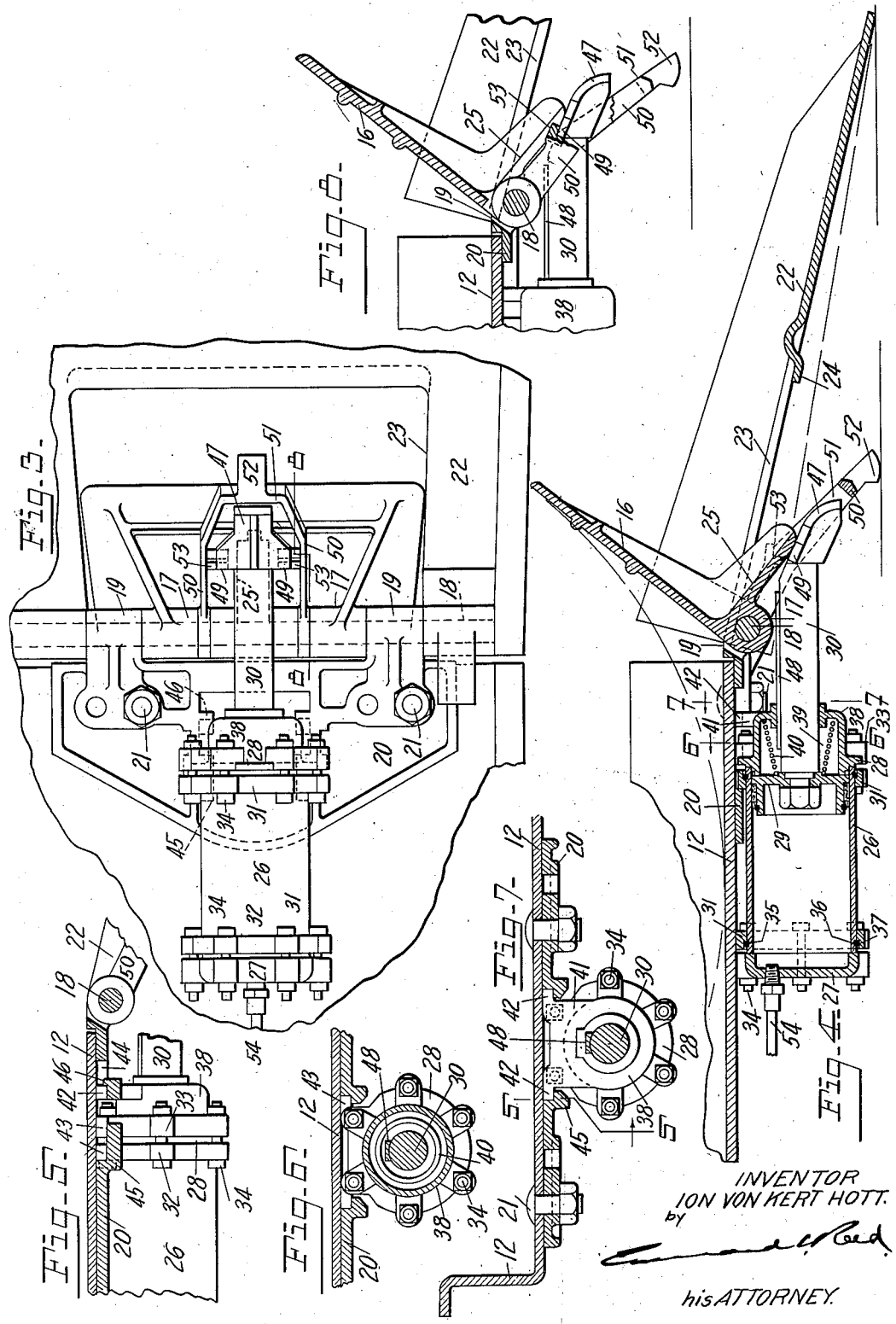

2,053,368

UNITED STATES PATENT OFFICE 2,053,368

LIFTING MECHANISM

Ion Von Kert Hott, Dayton, Ohio, assignor to The Joyce-Cridland Company, Dayton, Ohio, a corporation of Ohio Application March 24, 1934, Serial No. 717,189

11 Claims. (Cl. 254—89)

This invention relates to a lifting mechanism and more particularly to an automobile lift. In that type of automobile lift which is provided with runways on which the wheels of the automobile are supported it is customary to provide the runways with stop devices or chocks which can be moved into the paths of the wheels to prevent the automobile from running off the runways when the lift is in its elevated position. In many cases these stop devices or chocks are manually operated. In other cases they are automatic in their operation, the stop device being provided with gravity operated actuating means which will move the stop device to its elevated or operative position as the lift is elevated. These gravity operated devices, while for the most part satisfactory, are open to certain objections. For example, gravity operation is not entirely positive and may not serve to move the stop device to its locked position. Further, if a wheel of the automobile projects beyond the end of the runway it will prevent the stop device from being moved to its locked position and there will therefore be nothing to prevent the automobile from running off the runways.

One object of the present invention is to provide a lifting mechanism with means for positively moving the stop devices or chocks to their operative positions.

A further object of the invention is to provide a lifting mechanism with power operated means for actuating the stop devices, which will, in case a wheel projects beyond the end of the runway, press the stop device against the wheel with sufficient force to move the automobile along the runways and thus permit the stop device to move to its locked position.

A further object of the invention is to provide means for automatically moving the stop devices to their locked positions before the lift begins its upward movement.

A further object of the invention is to provide operating means for the stop devices which will be automatically controlled by the operating mechanism which elevates the automobile supporting structure or runways.

A further object of the invention is to provide fluid operated means for actuating the stop devices which will be connected with the fluid operated mechanism for elevating the runways and will move the stop devices to their operative positions at the beginning of the upward movement of the runways and will hold the stop devices in those positions throughout their said upward movement.

A further object of the invention is to provide an operating mechanism for the stop devices which will move the same to their operative positions and will remain in operative engagement therewith throughout both the upward and downward movements of the runways.

Other objects of the invention will appear as the mechanism is described in detail.

In the accompanying drawings Fig. 1 is a top plan view of an automobile lift embodying my invention; Fig. 2 is a side elevation of such a lift, partly broken away; Fig. 3 is a bottom plan view of one of the stop devices and its operating device; Fig. 4 is a longitudinal sectional view taken through one of the stop devices and its actuating device; Fig. 5 is a detail view, partly in section, on line 5—5 of Fig. 7, showing means for mounting the cylinder on the runway; Fig. 6 is a transverse section taken on the line 6—6 of Fig. 4; Fig. 7 is a transverse section taken on the line 7—7 of Fig. 4; Fig. 8 is a sectional view of a stop device and a portion of its operating mechanism; and Fig. 9 is a side elevation of a manually operated stop device.

In these drawings I have illustrated one embodiment of my invention and have shown the same as applied to an automobile lift of a well known type but it will be understood that the invention may be applied to lifting mechanisms of various kinds. The particular lift here shown is hydraulically operated and comprises a vertical cylinder 10 embedded in the ground and having mounted therein a ram 11. Mounted on the upper end of the ram is a supporting structure for the vehicle. This supporting structure may be of any suitable character which will permit the vehicle wheels to be moved onto and supported by the same. In the particular structure here illustrated the runways are in the form of tracks 12 rigidly connected one to the other by, and supported by, a transverse member 13 which is rigidly secured to the upper end of the ram. Fluid under pressure may be delivered to the cylinder 10, to operate the ram 11 in any suitable manner. In the present construction the lower portion of the cylinder is of an internal diameter slightly greater than the diameter of the ram and a supply pipe 14 communicates with the interior of the cylinder through the side wall thereof. The pipe 14 extends to a suitable source of supply of oil under pressure and may be provided with means, such as a valve 15, for controlling the flow of oil to and from the cylinder.

The vehicle supporting structure is provided with one or more stop devices mounted for movement into and out of the path of a part of the vehicle which is supported on the structure, these stop devices being so arranged that when in their operative positions they will prevent the vehicle from running off the runways. Preferably the stop devices are mounted at or near the ends of the runways, and, as shown in Fig. 1, each runway is provided at each end with a stop device. All four stop devices may be automatically operated or a part of them may be manually operated. In the arrangement shown I have provided each runway at one end with an automatically operated stop device and at the other end with a manually operated stop device, the two automatically operated stop devices being arranged at the opposite ends of the supporting structure as a whole.

The stop devices may be of any suitable construction and may be mounted in any suitable manner which will permit them to be moved into and out of the path of a part of the vehicle. I prefer, however, that they should be mounted at the respective ends of the runways on axes extending transversely to the runways. As here shown, each stop device comprises a plate, 16 and 16a, having at its rear edge bearing lugs 17 to receive a hinge pin 18 which is mounted in bearing lugs 19 carried by the adjacent end of the runway. In the present construction the bearing lugs 19 are formed on a plate 20 which is rigidly secured to the underside of the runway, as by means of bolts 21. It is also desirable that the stop device should form a part of the ramp 22 which guides the wheels of the vehicle onto the runway and which, in the present instance, is pivotally mounted on the hinge pin 18. As here shown, the ramp is provided in its rear or inner portion with an opening 23 and the stop device, when it is in its lower or inoperative position, lies wholly or partially within said opening, the ramp being provided at the forward edge of the opening with a shoulder 24 to support the stop device. Any suitable power operated means may be provided for actuating the stop device and I have here shown the stop device as having a downwardly extending arm 25 rigidly connected therewith and, if desired, formed integral therewith, and this arm is arranged to be engaged by a reciprocatory actuating member which, upon its forward movement, will move the stop device to its elevated or operative position.

As has been stated the power mechanism for actuating the stop device may be of various kinds and the type of mechanism employed will depend in part at least upon the character of the operating mechanism for elevating the lift. Where, as in the present instance, the lift is fluid operated, I provide a fluid operated device for actuating the stop device. In the construction here shown, the fluid operated device is in the form of a cylinder comprising a body portion 26 and cylinder heads 27 and 28. Mounted in this cylinder is a piston 29 having a forwardly extending piston rod or plunger 30 which engages the arm 25 to actuate the stop device. The body 26 of the cylinder is preferably formed of tubing and in order to secure the cylinder heads thereto I have mounted on the cylinder, near each end thereof, a collar 31 having a series of apertured lugs 32 adapted to be alined with the corresponding lugs 33 on the cylinder head and to receive bolts 34 by means of which the cylinder head is secured to the body of the cylinder. The collars may be secured to the body of the cylinder in any suitable manner, as by providing the cylinder near its ends with circumferential grooves 35 adapted to receive rings 36, which are preferably split so that they may be sprung over the end of the cylinder and into the grooves. In mounting a cylinder head on the cylinder the collar 31 is first slipped onto the body of the cylinder and moved beyond the groove 35, the ring 36 is then sprung into the groove and the collar moved outwardly into engagement therewith, the collar being provided with an inner annular recess 37 to receive the projecting portion of the rim. The forward cylinder head 28 has a hollow extension 38 to form a chamber 39 beyond the forward limit of movement of the piston 29, the chamber being of a diameter less than the diameter of the cylinder and the forward movement of the piston being limited by contact with the inner edge of the piston head. A spring 40 is confined between the end wall of the chamber and the piston to impart rearward movement to the latter.

The cylinder as a whole may be mounted on the runway in any suitable manner and, in the present construction, the extension 38 of the forward cylinder head is provided with upwardly extending lugs 41 adapted to bear at their upper edges against the bottom of the runway and having laterally extending parts 42. The two uppermost bolt lugs 33, both on the cylinder head and on the ring 31, are also provided with laterally extending parts 43 arranged in longitudinal alinement with the corresponding parts 42. The plate 20, which carries the bearings for the stop device, is provided with an opening 44 into which the several lugs extend and this plate is provided at the respective lateral edges of the opening with depending parts 45 having shoulders which extend beneath the adjacent lugs 42 and 43 and serve to support the cylinder. When the cylinder supporting lugs having been placed in position and the bolts 21 tightened down the cylinder will be clamped firmly in position on the runway, the lugs on the collar 31 will engage the rear edge of the opening, as shown in Fig. 5, to prevent rearward movement of the cylinder, and a stop lug 46 may be provided to engage the cylinder head and prevent the forward movement of the cylinder.

The plunger 30 is preferably provided at its forward end with a downwardly inclined part 47 to engage the arm 25 of the stop device and actuate the latter. This part is here shown as formed separate from the plunger and then rigidly secured to the end thereof, as by welding. The lower forward portion of the part 47 is inclined or curved at a broad angle to the length of the plunger and the upper portion of the part 47 is inclined at a sharp angle to the plunger, thus causing the plunger to impart a quick initial movement to the stop device and to then impart a slower and more powerful movement thereto, in the event any resistance is offered to the movement of the stop device. The opening in the extension 38 of the cylinder head, in which the plunger moves, is provided with a recess or keyway to receive a flat bar or key 48 which is rigidly secured to the plunger 30 to hold the same against rotation and retain the inclined end 47 thereof in proper relation to the arm 25.

A suitable device is provided for automatically locking the stop device in its elevated or operative position and this device is preferably moved to its locking position by gravity and moved out of its locking position by contact with the ground as the runway reaches the lower limit of its movement. In the present construction this locking device acts on the plunger 30 to hold the same against rearward movement until the lift has been lowered. As here shown, the forward end portion 47 of the plunger 30 is extended laterally beyond the respective sides of the plunger to form shoulders 49. The locking device comprises a pair of arms 50 pivotally mounted on the hinge pin 18 and extending downwardly and forwardly on opposite sides of the foremost position of the plunger and these arms are rigidly connected at their lower ends, as shown at 51, and the lower end of the device is relatively narrow and provided with a curved ground engaging surface 52. Each of the arms 50 has an inwardly extending lug 53 which is adapted to move into locking positions in the rear of one of the shoulders 49 on the plunger. When the lift is in its lowered position the end 52 of the locking device will be in engagement with the ground and the lugs 53 will be supported above and out of engagement with the shoulders 49 of the plunger, but the initial upward movement of the lift will permit the locking device to move downward by gravity and thus carry the lugs 53 into locking positions in the rear of the shoulders 49, thereby retaining the operating plunger in engagement with the arm 25 of the stop device and holding the latter in its elevated position. Inasmuch as the arm 25 bears against the operating plunger itself it will be apparent that the stop device is firmly held in its elevated position. When the lift is moved to its lower position the lower end 52 of the locking device will engage the ground and the further downward movement of the lift will cause the shoulders 49 to move out of engagement with the lugs 53, thereby releasing the plunger and permitting the same to be moved rearwardly by the action of the spring on the piston.

Operating fluid may be delivered to the cylinder 26 from any suitable source of supply but the delivery of this fluid to the cylinder is preferably controlled by the lifting means for the runways and, in the present instance, the cylinder receives its operating fluid from the cylinder 10 of the lift. To this end a pipe 54 is connected with the rear end of the cylinder 26 and extends along the supporting structure to a point above the ram where it is connected with the upper end of a pipe 55 which extends downwardly through the ram and is in open communication with the cylinder at the bottom of the ram. Consequently when fluid under pressure is admitted to the cylinder 10 a portion of the fluid will pass through the pipes 55 and 54 to the cylinder 26 and will actuate the piston and the plunger 30. Pressure will be applied simultaneously to the piston and to the ram but inasmuch as much lessser power is required to operate the piston than is required to elevate the lift the piston will be operated first and no movement will be imparted to the ram until the forward movement of the piston has been interrupted. The ram will then be moved upwardly but pressure on the piston will be maintained and as soon as a slight upward movement is imparted to the ram the locking device will move into locking relation to the plunger and thus positively lock the plunger and piston in their foremost positions. Therefore, when the pressure in the lift cylinder 10 is relieved to permit the runways to move downwardly the plunger will remain in operative engagement with the stop actuating arm 25 until the runways are almost completely lowered and the locking device is moved to its unlocking position.

When this takes place the piston and plunger are released and will be moved rearwardly by the spring 40. If a wheel should project beyond the end of the runway far enough to be engaged by the stop device before the latter reaches its final position, the actuating force exerted on the plunger will be sufficient to force the wheel along the runway and thus permit the stop device to complete its movement.

The manually operated stop devices, as shown at 16a, are similar in construction to the automatically operated stop devices but are differently controlled. They are preferably provided with hand holes 56 to permit them to be grasped by the hand of the operator and moved to their elevated positions. Pivotally mounted on each of these stop devices is an arm 57 in which is formed a slot 58 to receive a pin 59 carried by a bracket 60 on the runway. The slot has its rear end offset upwardly so that as the arm is carried forward by the elevation of the stop device the offset portion of the slot will be brought into line with the pin and the arm will drop into locking engagement with the pin. A handle 61 is connected with the arm and so arranged that it may be easily manipulated by the operator to move the arm 57 out of locking engagement with the pin and thereby permit the stop device to be lowered. The power operated stop devices 16 may be moved manually to their operative positions and it will be obvious that they may be provided with means, such as that shown in connection with the manually operated stop devices, to retain the same in their operative positions, when they are elevated independently of the power operated devices. No such means has been shown in the present case because where a part of the stop devices are manually operated it is unnecessary that the power operated devices should be manually operated.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a lifting mechanism comprising a runway and means for elevating said runway, a stop device mounted on said runway for movement into and out of the path of a vehicle on said runway, power operated means for actuating said stop device, means controlled by the means for elevating said runway to cause power to be applied to said actuating means, and a gravity operated device to lock said stop device in said path, said locking device having means controlled by the downward movement of said runway to move the same to unlocking position.

2. In a lifting mechanism comprising a runway and means for elevating said runway, a stop device pivotally mounted on said runway for movement into and out of the path of a vehicle on said runway and having a part extending transversely to its pivotal axis, a reciprocatory member carried by said runway, said member having at its forward end a part to engage said part of said stop device and move the latter about its pivotal axis and having a portion extending laterally from said member, means for actuating said reciprocatory member, and a locking device mounted for movement by gravity into locking position in the rear of said lateral portion of said reciprocatory member and having a part arranged to engage the ground and cause said locking device to be disengaged from said lateral portion when said runway is moved to its lowermost position.

3. In a lifting mechanism comprising a runway and means for elevating said runway, a stop device pivotally mounted on one end of said runway on an axis extending transversely to said runway and having a downwardly extending arm, a cylinder carried by said runway, a piston in said cylinder, means to deliver fluid under pressure to said cylinder, a plunger connected with said piston and having an inclined portion to engage said arm and actuate said stop device, and also having parts projecting laterally on the respective sides thereof, a locking device pivotally mounted on said runway and having arms arranged on opposite sides of said plunger, said arms having inwardly extending lugs arranged to be moved by gravity into locking positions in the rear of the respective lateral parts of said plunger, and said locking device also having a part to engage the ground and cause said lugs to be disengaged from said lateral portions of said plunger when said runway is moved to its lowered position.

4. In a lifting mechanism comprising a runway and means for elevating said runway, a stop device mounted near one end of said runway for movement into and out of the path of a vehicle on said runway, an actuating device to move said stop device into said path, means for operatively connecting said actuating device with and controlling the same by the means for elevating said runway, and a locking device separate from said connecting means and controlled by the vertical movement of said runway for holding said stop device in the path of said vehicle while said runway is in an elevated position.

5. In a lifting mechanism comprising a runway and means for elevating said runway, a stop device mounted near one end of said runway for movement into and out of the path of a vehicle on said runway, an actuating member to move said stop device into said path, means for operatively connecting said actuating member with and controlling the same by the means for elevating said runway, and means separate from said connecting means and controlled by the vertical movement of said runway for holding said actuating member against reverse movement while said runway is in an elevated position.

6. In a lifting mechanism comprising a runway and means for elevating said runway, a stop device mounted near one end of said runway for movement into and out of the path of a vehicle on said runway, an actuating member to move said stop device into said path, means operatively connected with and controlled by the means for elevating said runway to impart operative movement to said actuating member, and a locking device separate from said means and controlled by the vertical movement of said runway to retain said actuating member in its operative position while said runway is in an elevated position and having a ground engaging part to release said actuating member for reverse movement when said runway is moved to its lowered position.

7. In a lifting mechanism comprising a runway and means for elevating said runway, a stop device pivotally mounted on said runway for movement into and out of the path of a vehicle on said runway, a reciprocatory member carried by said runway and arranged to engage a part of said stop device and actuate the latter, means for actuating said reciprocatory member, and a locking device arranged to move automatically into locking engagement with said reciprocatory member when said stop device has been moved into the path of said vehicle and to retain the same in a position to hold said stop device in the path of said vehicle.

8. In a lifting mechanism comprising a runway and means for elevating said runway, a stop device mounted on said runway for movement into and out of the path of a vehicle on said runway, a reciprocatory member carried by said runway, means for actuating said reciprocatory member, and a locking device mounted for movement by gravity into locking position in the rear of a portion of said reciprocatory member and having a part arranged to engage the ground and cause said locking device to be disengaged from said portion when said runway is moved to its lowermost position.

9. In a lifting mechanism comprising a runway, and means for elevating said runway, a normally inoperative stop device pivotally mounted at one end of said runway for movement upwardly and toward said runway, an actuating member slidably mounted beneath said runway and arranged to engage said stop device with a cam action to move the same upwardly, means for imparting operative movement to said actuating member, and means controlled by the movement of said runway to lock said stop device in its operative position while said runway is in an elevated position.

10. In an automobile lift comprising a runway having a ramp at one end thereof, and means for elevating said runway, a stop device pivotally mounted at said end of said runway for movement to a position substantially parallel with said ramp or to an upwardly extending position in the path of a vehicle on said runway, an actuating member mounted for movement lengthwise of said runway and arranged to act on said stop device with a cam action to move the same to said upwardly extending position, and means connected with and controlled by said means for elevating said runway to impart operative movement to said actuating member.

11. In an automobile lift comprising a runway having a ramp at one end thereof, and means for elevating said runway, a stop device pivotally mounted at said end of said runway for movement to a position substantially parallel with said ramp or to an upwardly extending position in the path of a vehicle on said runway, an actuating member mounted for movement lengthwise of said runway and arranged to act on said stop device with a cam action to move the same to said upwardly extending position, means for imparting operative movement to said actuating member, and a device controlled by the vertical movement of said runway to lock said stop device in said upwardly extending position when said runway is in an elevated position and to automatically release said stop device when said runway is moved to its lowered position.

ION VON KERT HOTT.